US012231977B2

(12) United States Patent
Atawia

(10) Patent No.: US 12,231,977 B2
(45) Date of Patent: Feb. 18, 2025

(54) CELLULAR NETWORK TUNING USING SECONDARY SYSTEM FEEDBACK

(71) Applicant: Dell Products, L.P., Round Rock, TX (US)

(72) Inventor: Ramy Atawia, Kanata (CA)

(73) Assignee: Dell Products, L.P., Round Rock, TX (US)

( * ) Notice: Subject to any disclaimer, the term of this patent is extended or adjusted under 35 U.S.C. 154(b) by 382 days.

(21) Appl. No.: 17/664,688

(22) Filed: May 24, 2022

(65) Prior Publication Data

US 2023/0388877 A1 Nov. 30, 2023

(51) Int. Cl.
*H04W 36/00* (2009.01)
*H04W 24/10* (2009.01)
*H04W 36/30* (2009.01)

(52) U.S. Cl.
CPC ....... *H04W 36/0085* (2018.08); *H04W 24/10* (2013.01); *H04W 36/30* (2013.01)

(58) Field of Classification Search
CPC .. H04W 36/0085; H04W 24/10; H04W 36/30
See application file for complete search history.

(56) References Cited

U.S. PATENT DOCUMENTS

| | | | | |
|---|---|---|---|---|
| 9,826,412 | B2* | 11/2017 | Henderson | H04L 43/00 |
| 10,555,191 | B1* | 2/2020 | Jat | H04W 24/08 |
| 11,304,074 | B1* | 4/2022 | Bellamkonda | H04W 24/02 |
| 11,563,652 | B2* | 1/2023 | Seetharaman | H04L 41/0895 |
| 2016/0014617 | A1* | 1/2016 | Sofuoglu | H04W 36/0085 370/252 |
| 2017/0048269 | A1* | 2/2017 | York | H04L 67/10 |
| 2018/0132105 | A1* | 5/2018 | Nealis | H04W 12/08 |
| 2018/0366021 | A1* | 12/2018 | Zertuche | G09B 7/00 |
| 2019/0159048 | A1* | 5/2019 | Feldkamp | H04L 43/08 |
| 2019/0199589 | A1* | 6/2019 | Le | G06N 20/00 |
| 2020/0076520 | A1* | 3/2020 | Jana | H04B 17/327 |
| 2021/0022024 | A1* | 1/2021 | Yao | H04W 24/08 |
| 2021/0068025 | A1* | 3/2021 | Shukla | H04W 16/14 |
| 2021/0203576 | A1* | 7/2021 | Padfield | H04L 43/04 |
| 2022/0245013 | A1* | 8/2022 | Ciabarra, Jr. | G06F 11/0778 |
| 2023/0016839 | A1* | 1/2023 | Malboubi | H04L 41/0895 |
| 2023/0217312 | A1* | 7/2023 | Atawia | H04W 24/08 370/252 |

(Continued)

FOREIGN PATENT DOCUMENTS

WO  WO-2013144950 A1 * 10/2013 ............ H04W 16/18

*Primary Examiner* — Michael J Moore, Jr.
(74) *Attorney, Agent, or Firm* — Amin, Turocy & Watson, LLP

(57) ABSTRACT

The described technology is generally directed towards cellular network tuning using secondary system feedback. Network equipment can monitor both network performance and secondary system feedback indicative of secondary equipment performance. The secondary equipment can comprise customer manufacturing, processing, or other equipment. The secondary equipment performance can be correlated with network performance such as by correlating secondary equipment performance degradations with degradations of one or more network performance indicators. Network parameters can be adjusted in view of the observed correlation, to produce performance improvements of the secondary equipment.

20 Claims, 9 Drawing Sheets

(56) References Cited

U.S. PATENT DOCUMENTS

2023/0237404 A1* 7/2023 Jayathirtha .......... G06Q 10/063
 705/7.28
2023/0388877 A1* 11/2023 Atawia ............. H04W 36/0085
2023/0388883 A1* 11/2023 Atawia ............. H04W 36/0069

* cited by examiner

|  | $T^{(pt)}$ | $C^{(t)}$ | $D^{(t)}$ | R | H |
|---|---|---|---|---|---|
| $T^{(pt)}$ |  | $r_{1,2}$ | $r_{1,3}$ | $r_{1,4}$ | $r_{1,5}$ |
| $C^{(t)}$ | $r_{2,1}$ |  | $r_{2,3}$ | $r_{2,4}$ | $r_{2,5}$ |
| $D^{(t)}$ | $r_{3,1}$ | $r_{3,2}$ |  | $r_{3,4}$ | $r_{3,5}$ |
| R | $r_{4,1}$ | $r_{4,2}$ | $r_{4,3}$ |  | $r_{4,5}$ |
| H | $r_{5,1}$ | $r_{5,2}$ | $r_{5,3}$ | $r_{5,4}$ |  |

Columns $T^{(pt)}$, $C^{(t)}$, $D^{(t)}$: Secondary Equipment Performance Indicators 510
Columns R, H: Network Performance Indicators 520

Performance Indicator Correlation Matrix 500

FIG. 5

CELLULAR NETWORK TUNING USING SECONDARY SYSTEM FEEDBACK

TECHNICAL FIELD

The subject application generally relates to cellular networks, for example, to adjustment of network parameters in order to improve performance of secondary systems, and related embodiments.

BACKGROUND

Cellular networks enable a wide range of enterprise automation use-cases with various requirements, such as low latency or high data rate. Network misconfiguration can deteriorate the business efficiency of a customer enterprise, violate the customer's enterprise automation requirements, and violate the customer's service level agreement.

In order to avoid the problems associated with network misconfiguration, network operators continuously monitor network key performance indicators (KPIs) and tune network parameters to improve network performance. However, finding optimal network parameter configurations that achieve target KPI values is challenging.

The challenges of tuning network parameters are partly due to the large set of parameters that have been adopted to allow for flexible network design. Furthermore, there are trade-offs between different network KPIs (e.g., user vs. cell throughput) which obligate the network operator to pick compromise configurations. There are also KPI time variations due to network dynamics such as varying load and aperiodic traffic. Moreover, extensive parameter tuning should be avoided as it can increase operational cost and signaling overhead, in addition to prolonging network downtime.

Current network optimization techniques generally rely on third generation partnership project (3GPP) defined network KPIs, such as data rate and latency, to evaluate network performance. However, network KPIs do not always reflect the actual gains and losses experienced by enterprise automation use-cases and customer business processes. Current network optimization techniques are therefore prone to false alarms and unnecessary optimizations/recommendations, for example when network performance is not the root cause of business efficiency degradation. Current techniques are furthermore prone to suboptimal parameter setting that does not necessarily guarantee improvements at a customers' vertical applications, business processes, or enterprise automation use-cases.

The above-described background is merely intended to provide a contextual overview of some current issues and is not intended to be exhaustive. Other contextual information may become further apparent upon review of the following detailed description.

BRIEF DESCRIPTION OF THE DRAWINGS

The technology described herein is illustrated by way of example and not limited in the accompanying figures in which like reference numerals indicate similar elements and in which:

FIG. 5 illustrates an example performance indicator correlation matrix such as may be employed in accordance with one or more embodiments described herein.

DETAILED DESCRIPTION

Figure 1:
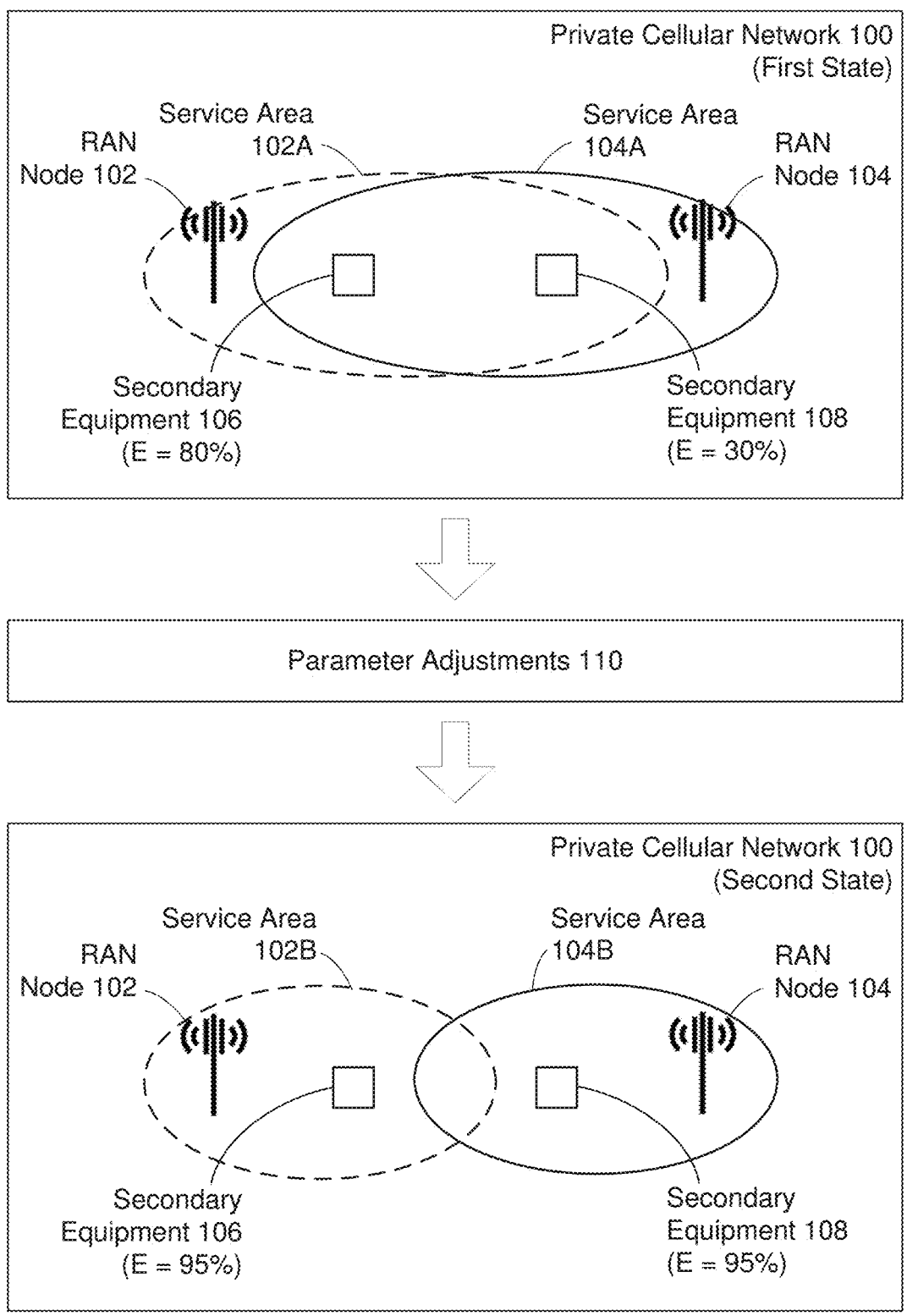
FIG. 1 is a state diagram illustrating example states of a network before and after network tuning based on secondary system feedback, in accordance with one or more embodiments described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

Example embodiments are directed towards cellular network tuning using secondary system feedback. Network equipment can monitor both network performance and secondary system feedback indicative of secondary equipment performance. The secondary equipment can comprise, e.g., customer equipment such as manufacturing or processing equipment. The secondary equipment performance can be correlated with network performance, for example by correlating secondary equipment performance degradations with degradation of one or more network performance indicators. Network parameters can then be adjusted to produce performance improvements of the secondary equipment. Embodiments can also avoid or reduce unnecessary network parameter adjustments which will not improve performance of the secondary equipment. Further aspects and embodiments of this disclosure are described in detail below.

FIG. 1 is a state diagram illustrating example states of a network before and after network tuning based on secondary system feedback, in accordance with one or more embodiments described herein. FIG. 1 includes a first state of an example private cellular network 100 and a second state of the private cellular network 100. The private cellular network 100 includes a first example radio access network (RAN) node 102 and a second example RAN node 104. The private cellular network 100 can provide network connectivity for secondary equipment, e.g., secondary equipment 106 and secondary equipment 108.

In the first state of the private cellular network 100, the RAN node 102 has a service area 102A, the RAN node 104 has a service area 104A, the secondary equipment 106 operates at an efficiency (E) of 80%, and the secondary equipment 108 operates at an efficiency (E) of 30%. Network equipment of the private cellular network 100 can be configured to detect, according to the techniques disclosed herein, a performance degradation of the secondary equipment 106 and/or the secondary equipment 108, such as the low operating efficiency of the secondary equipment 106 and/or the secondary equipment 108.

The private cellular network 100 can be configured to detect one or more correlated network 100 performance indicators of the private cellular network 100 which have also experienced a performance degradation, wherein the performance degradation of the correlated network 100 performance indicators correlates with the secondary equipment 106, 108 performance degradation. The private cellular network 100 can furthermore be configured to identify network parameters of the private cellular network 100 that can be adjusted to produce a modification of the correlated network 100 performance indicators. The private cellular network 100 can implement parameter adjustments 110 of the identified parameters, to transition the private cellular network 100 to the second state illustrated in FIG. 1.

In the second state of the private cellular network 100, the RAN node 102 has a service area 102B, the RAN node 104 has a service area 104B, the secondary equipment 106 operates at an efficiency (E) of 95%, and the secondary equipment 108 also operates at an efficiency (E) of 95%. The parameter adjustments 110 produced a modification of the network 100 that addressed/improved the correlated network 100 performance indicators as well as the performance of the secondary equipment 106, 108. An example byproduct of the parameter adjustments 110 was the modification of the service areas 102A and 104A, which illustrates an example change in the private cellular network 100 configuration which may or may not be related to the performance improvement of the secondary equipment 106, 108.

In FIG. 1, an example scenario in which a private cellular network 100 provides network connectivity for secondary equipment 106, 108 is illustrated. For example, a manufacturer may operate both manufacturing equipment, which can implement the secondary equipment 106, 108, as well as the private cellular network 100 used alongside the manufacturing equipment. The private cellular network 100 can provide, e.g., control, reporting, coordination and/or other functions for the secondary equipment 106, 108. Other scenarios, involving networks other than private cellular networks and other types of secondary equipment, can also be within the scope of this disclosure.

Private cellular network 100 can comprise a private 5G network. Private 5G networks can be configured according to this disclosure to conduct continuous monitoring and optimization to improve the performance of served vertical applications, such as automated manufacturing processes of secondary equipment 106, 108. Network optimization generally relies on radio KPIs that are defined by 3GPP. To achieve better fulfilment of service level agreements and Quality of Experience (QoE) gains, this disclosure provides a method to optimize network configuration parameters based on secondary equipment 106, 108 performance indicators, also referred to herein as "secondary equipment KPIs" which can include items such as work efficiency of machines, downtime, average cycle time, throughput, and other process related information (e.g., workload). Hence, embodiments can derive secondary equipment operational gains from modifications to deployed network resources. In addition, methods can learn the correlation between the network 100 configuration and the target secondary equipment 106, 108 KPIs to identify key parameters that retain secondary equipment 106, 108 performance with minimal optimization overhead.

In some embodiments, methods according to this disclosure can tune parameters of private networks based on secondary equipment 106, 108 KPIs of a host enterprise. Methods can utilize secondary equipment 106, 108 KPIs to monitor the performance of the deployed private network 100. The secondary equipment 106, 108 KPIs can include, e.g., manufacturing process related metrics such as downtime, cycle time, delivery time, machine throughput and on time delivery. Methods can calculate the correlation between secondary equipment 106, 108 KPIs, network 100 KPIs and network parameters to optimize vertical applications. This can be achieved by correctly classifying, when appropriate, the root cause of secondary equipment 106, 108 performance degradation as network 100 misconfiguration, identifying the key network 100 parameters that have the potential to improve or retain secondary equipment 106, 108 KPIs, and proposing parameter adjustments 110 for misconfigured network 100 parameters.

Figure 2:
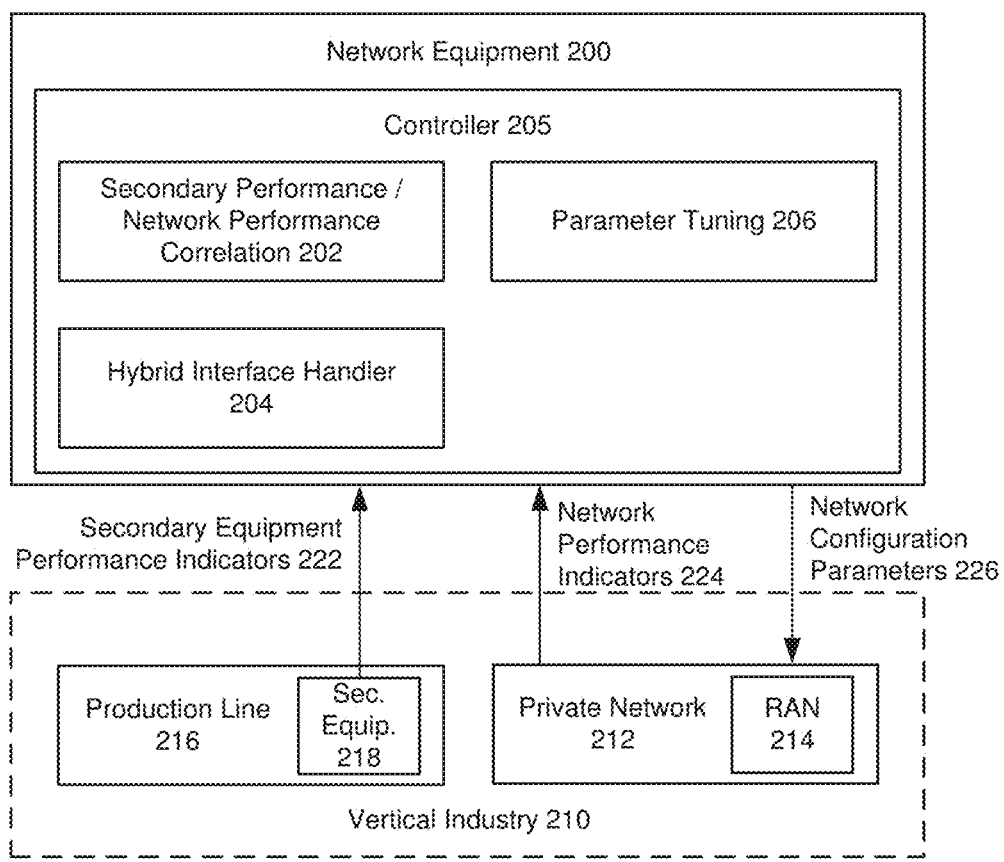
FIG. 2 illustrates an example controller adapted to perform network tuning based on secondary system feedback, in accordance with one or more embodiments described herein.

FIG. 2 illustrates an example controller adapted to perform network tuning based on secondary system feedback, in accordance with one or more embodiments described herein. FIG. 2 includes network equipment 200 and a vertical industry 210. The network equipment 200 comprises a controller 205, and the controller 205 comprises secondary performance/network performance correlation 202, hybrid interface handler 204, and parameter tuning 206. The vertical industry 210 comprises a production line 216 including secondary equipment 218, and a private network 212 comprising a RAN 214. In some embodiments, the network equipment 200 including the controller 205 can be included within the private network 212. In other embodiments, the network equipment 200 including the controller 205 can be hosted elsewhere, e.g., within a core network or cloud coupled with the private network 212. The private network 212 can implement the private cellular network 100 introduced in FIG. 1, and the secondary equipment 218 can implement the secondary equipment 106, 108 illustrated in FIG. 1.

In an example scenario according to FIG. 2, the controller 205 can obtain secondary equipment performance indicators 222 from secondary equipment 218. The secondary equipment performance indicators 222 can be obtained, e.g., via the hybrid interface handler 204. The secondary performance/network performance correlation 202 can be adapted to monitor the secondary equipment performance indicators 222 to detect performance degradation of the secondary equipment 218.

The secondary performance/network performance correlation 202 can furthermore be adapted to obtain network performance indicators 224 from the private network 212. The network performance indicators 224 can also be obtained, e.g., via the hybrid interface handler 204. The network performance indicators 224 can optionally comprise KPIs related to network 212 and RAN 214 performance, such as latency, delay, and other network KPIs.

The secondary performance/network performance correlation 202 can identify one or more correlated network performance indicators among the network performance indicators 224, wherein the correlated network performance indicators show a performance degradation that is correlated with the performance degradation of the secondary equipment 218, e.g., by occurring simultaneously with, or preceding, the performance degradation of the secondary equipment 218.

Parameter tuning 206 can identify network configuration parameters that can be adjusted in order to produce a modification or improvement of the correlated network performance indicators. Parameter tuning 206 can then determine appropriate adjustment values of the identified network configuration parameters. Parameter tuning 206 can adjust the private network 212 and/or the RAN 214 by providing network configuration parameters 226 to the private network 212 and/or the RAN 214, wherein the network configuration parameters 226 includes the determined adjustments to the identified network configuration parameters.

The controller 205 can optionally interact with a network analytics engine, e.g., at a service management and orchestration (SMO) component of the private network 212, as well as with a business intelligence layer deployed by the vertical industry 210 for data collection and parameter tuning. The controller 205 can be deployed either on-premises via dedicated machines, or on public/private cloud resources. The controller 205 can communicate with network elements of the private network 212 for optimization actions, either directly or through a network analytics controller.

The hybrid interface handler 204 can optionally be configured to interact with multiple systems with various different data models. For example, the hybrid interface handler 204 can be configured to interact with a business operations and management/analytics engine to gather secondary equipment performance indicators 222 from secondary equipment 218 machines and controllers. Furthermore, the hybrid interface handler 204 can be configured to interact with a network operations and management/analytics system (e.g., a SMO) to gather wireless network KPIs 224 and recommend actions to network 212.

Figure 3:
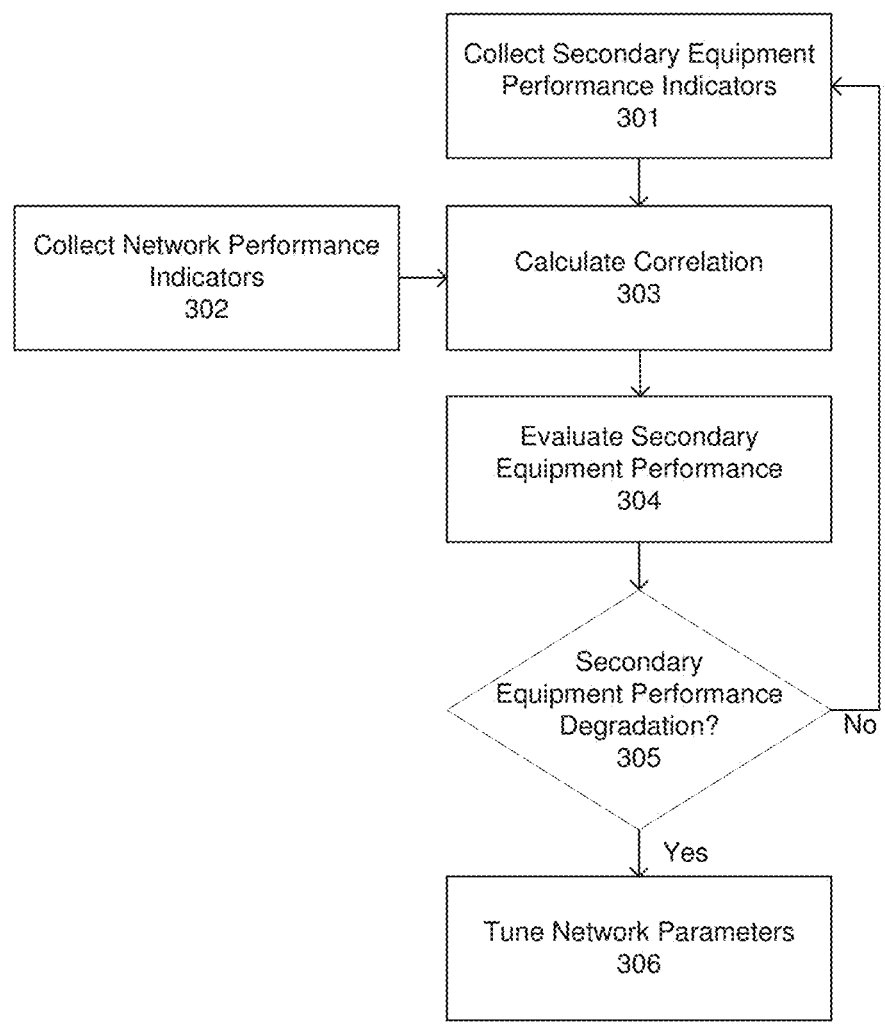
FIG. 3 is a flow diagram illustrating example operations that can be performed by a controller in connection with network tuning based on secondary system feedback, in accordance with one or more embodiments described herein.

FIG. 3 is a flow diagram illustrating example operations that can be performed by a controller in connection with network tuning based on secondary system feedback, in accordance with one or more embodiments described herein. FIG. 3 includes, "collect secondary equipment performance indicators" 301, "collect network performance indicators" 302, "calculate correlation" 303, "evaluate secondary equipment performance" 304, "secondary equipment performance degradation?" 305, and "tune network parameters" 306.

At operation 301, the controller 205 illustrated in FIG. 2 can be configured to collect secondary equipment KPIs 222 such as process efficiency, downtime, delivery time, etc. At operation 302, the controller 205 can be configured to collect network performance indicators 224 such as configuration (e.g., handover threshold) and KPIs (e.g., handover success rate). At operation 303, the controller 205 can be configured to calculate the correlation between secondary equipment KPIs 222 and network performance indicators 224. At operation 304, the controller 205 can be configured to evaluate secondary equipment 218 performance by comparing the secondary equipment KPIs 222 to target or historical values therefor. At operation 305, in the case of detected degradation (from operation 304), the controller 205 can be configured to trigger network configuration to tune, at operation 306, the network parameters 226 using the calculated correlation in operation 303. In the case of no detected degradation at 305, the method can return from operation 305 to operation 301.

Figure 4:
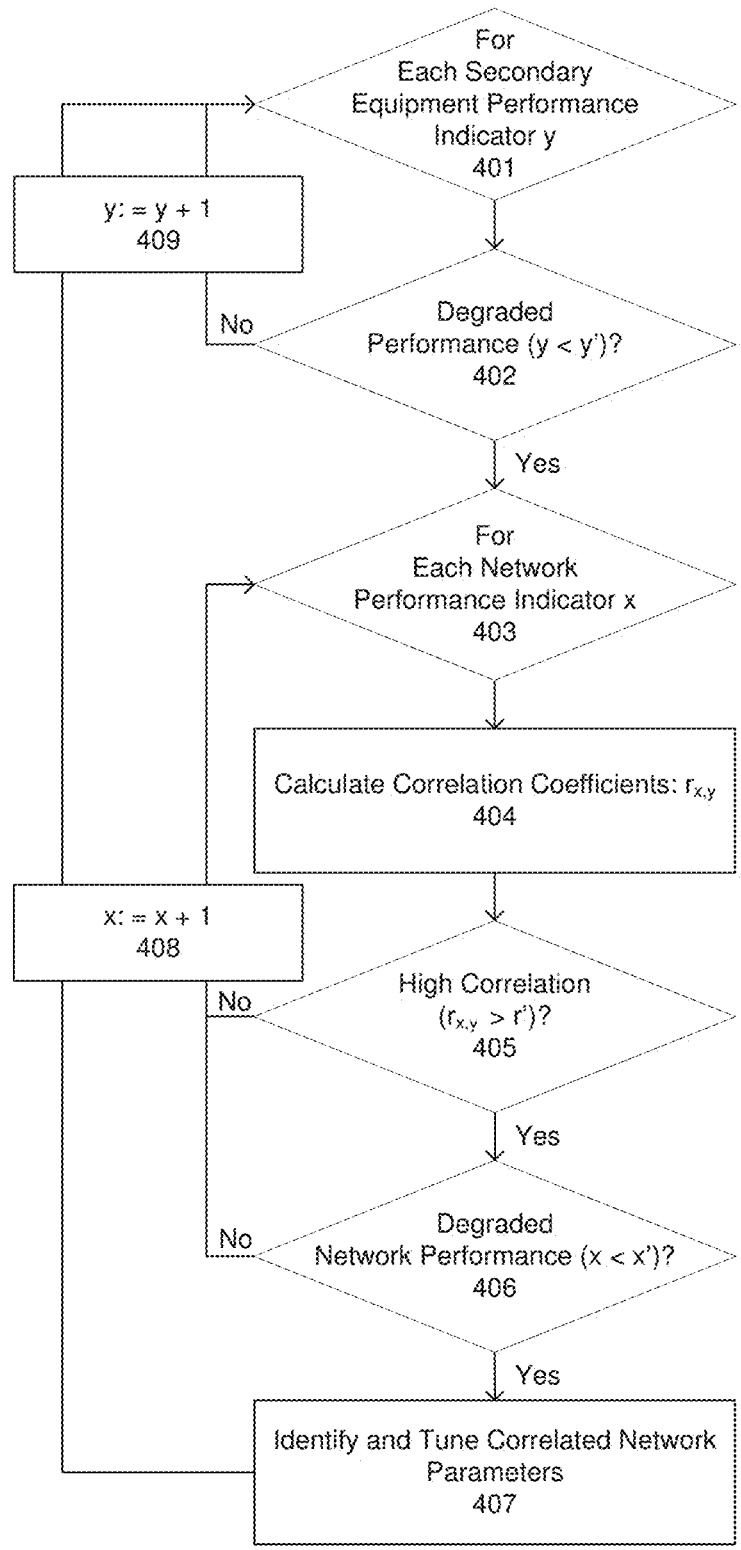
FIG. 4 is a flow diagram illustrating example operations that can be performed in in connection with some network tuning implementations, in accordance with one or more embodiments described herein.

FIG. 4 is a flow diagram illustrating example operations that can be performed in in connection with some network tuning implementations, in accordance with one or more embodiments described herein. FIG. 4 includes, "for each secondary equipment performance indicator y" 401, and "degraded performance (y<y')?" 402. If no at 402, then "y: =y+1" 409, and the process can return to 401. If yes at 402, then "for each network performance indicator x" 403, "calculate correlation coefficients: $r_{x,y}$" 404, and "high correlation ($r_{x,y}$>r')?" 405. If no at 405, then "x: =x+1" 408, then the process can return to 403. If yes at 405, then "degraded network performance (x<x')?" 406. If no at 406, then "x: =x+1" 408, then the process can return to 403. If yes at 406, then "tune correlated network parameters" and the process can return to 401 via 408 and 409.

FIG. 4 can be understood using the example of handover parameter optimization to improve secondary equipment throughput and delivery. Prior to performing the illustrated operations, secondary equipment KPIs can be collected, such as:

Process Throughput($T^{(p,i)}$)=(number of units)/(time)

Cycle time($C^{(i)}$)=process end−process start

Delivery time($D^{(i)}$)=delivery end−delivery start

Furthermore, network KPIs can be collected, such as:

Data rate($R$)=(number of bits)/(time)

Handover success rate($H$)=success handovers/total handovers

Furthermore, network configuration parameters can be collected, such as:
  QoS parameter (Q): priority of traffic
  Handover parameters (M): handover margin
Processing a selected secondary equipment KPI (referred to as y) from among the collected secondary equipment KPIs can be initiated at operation 401. Next, at 402, degradation of a secondary equipment KPI can be detected. For example:
  IF KPI y is lower than target value y' (calculated as weighted average of historical values for KPI y or defined by the enterprise owner), proceed to operation 403.
  ELSE, increment y and repeat operation 401.
Processing a selected network KPI (referred to as x) from among the collected network KPIs can be initiated at operation 403. Next, at 404, correlation coefficients ($r_{x,y}$) between a degraded secondary equipment KPI y and a network KPI x can be calculated, e.g., as follows:

$r_{x,y} = r_{y,x} = \text{Sum}((x_i - \text{mean}(X))(y_i - \text{mean}(Y)))/(\text{Sum}((x_i - \text{mean}(X))^2 \text{Sum}((y_i - \text{mean}(Y))^2))^{0.5}$ Correlation coefficients can be included in a performance indicator correlation matrix. FIG. 5 illustrates an example performance indicator correlation matrix such as may be employed in accordance with one or more embodiments described herein.

Returning to FIGS. 4, at 405 and 406, correlated network KPIs can be detected, wherein the correlated network KPIs exhibit degraded performance that is correlated with degradation of a secondary equipment KPI, detected at 402. Example operations at 405 and 406 can include:

IF $r_{x,y}$>r' AND x<x' (i.e., correlated network KPI to degraded secondary equipment KPI), then proceed to operation 406.

ELSE, increment x and repeat operation 403.

At 407, network configuration parameters (referred to as z) for adjustment can be identified and adjusted. To identify appropriate network configuration parameters for adjustment, some embodiments can calculate a point-biserial correlation coefficient between each network KPI x and each configuration parameter z. The following definitions can be used in some embodiments:

$$S_{pq}=(1/Sn)*(M1-M0)*(p*q)^{\wedge}0.5$$

M1=mean value of network KPI x when parameter z is changed

M0=mean value of network KPI x when parameter z is not changed

Sn=standard deviation in KPI x p=number of occurrences when network parameter z has changed q=number of occurrences when network parameter z is unchanged In some embodiments, a most correlated network configuration parameter can be selected. In other embodiments, a group of most correlated network configuration parameters can be selected, such as the top 3 or 5 most correlated network configuration parameters.

To adjust/tune identified network configuration parameters, some embodiments can apply the below example approach:

IF $S_{pq}$>0.5 (i.e., positive correlation), then change the value of parameter z ELSEIF $S_{pq}$<-0.5 (i.e., negative correlation), then revert the value of parameter z ELSE (no correlation), then repeat network configuration parameter identification (check next network configuration parameter)

ENDIF

Figure 6:
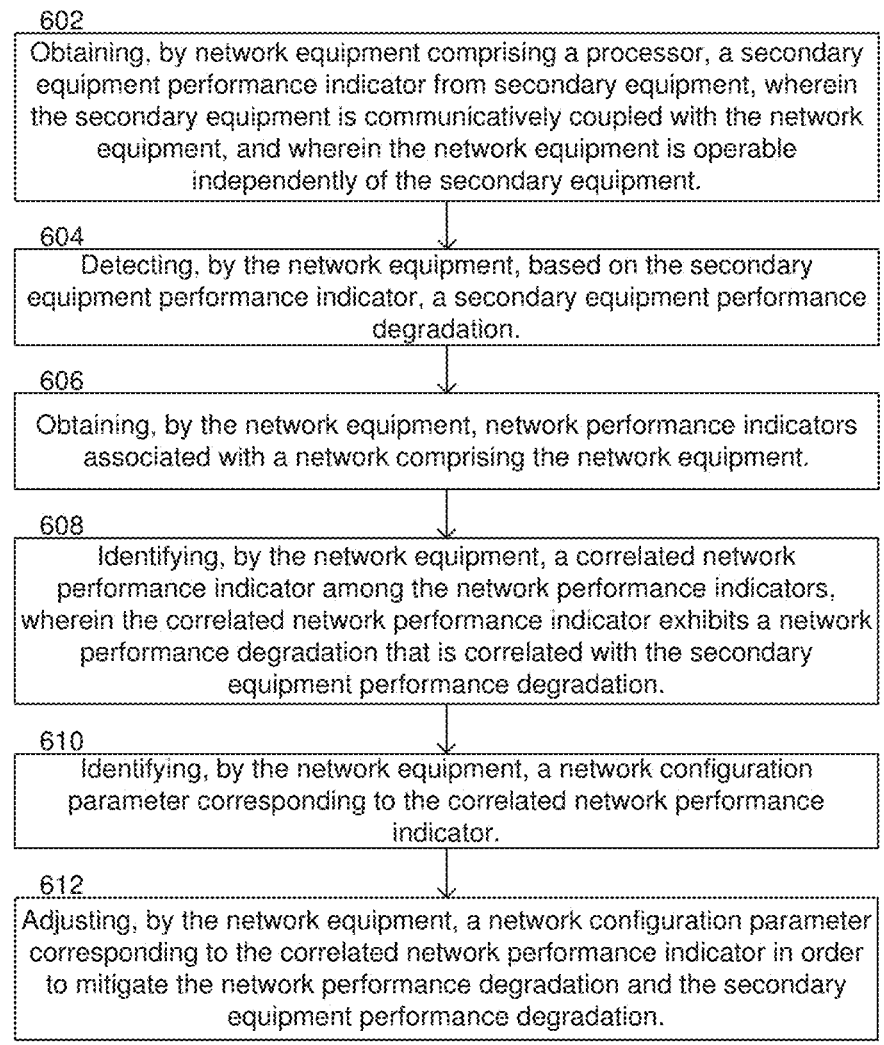
FIG. 6 is a flow diagram of a first example, non-limiting computer implemented method for adjusting network parameters based on secondary system feedback, in accordance with one or more embodiments described herein.

FIG. 6 is a flow diagram of a first example, non-limiting computer implemented method for adjusting network parameters based on secondary system feedback, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 6 can be performed by network equipment 200 comprising a controller 205 such as illustrated in FIG. 2. Operation 602 comprises obtaining, by network equipment 200 comprising a processor, a secondary equipment performance indicator 222 from secondary equipment 218, wherein the secondary equipment 218 is communicatively coupled with the network equipment 200, and wherein the network equipment 200 is operable independently of the secondary equipment 218. The network equipment 200 can comprise, e.g., equipment of a private cellular network 212 or network equipment communicatively coupled with a private cellular network 212. The secondary equipment 218 can comprise, e.g., manufacturing equipment, processing equipment, or other customer business equipment that performs business production functions and also uses network connectivity in connection with its operation.

The secondary equipment performance indicator 222 can comprise, for example, a process throughput of the secondary equipment 218, a cycle time of the secondary equipment 218, or a delivery time of the secondary equipment 218, or another measurement of secondary equipment 218 performance. Obtaining the secondary equipment performance indicator 222 at operation 602 can comprise, e.g., obtaining the secondary equipment performance indicator 222 repetitively over a time period, such as once every second (or other interval) over a time period of minutes, hours, days, weeks, etc.

Operation 604 comprises detecting, by the network equipment 200, based on the secondary equipment performance indicator 222, a secondary equipment 218 performance degradation. In some embodiments, the secondary equipment performance degradation can be detected based on the secondary equipment performance indicator 222 passing a target value. For example, a process throughput of the secondary equipment 218 can degrade below a target process throughput.

Operation 606 comprises obtaining, by the network equipment 200, network performance indicators 224 associated with a network, e.g., network 212, comprising the network equipment 200. The network performance indicators 224 can comprise any network KPIs, e.g., at least one of a data rate parameter or a handover success rate parameter.

Operation 608 comprises identifying, by the network equipment 200, a correlated network performance indicator among the network performance indicators 224, wherein the correlated network performance indicator exhibits a network 212 performance degradation that is correlated with the secondary equipment 218 performance degradation. In some embodiments, identifying the correlated network performance indicator can comprise, e.g., determining correlation coefficients indicative of correlation between the secondary equipment performance indicator 222 and the network performance indicators 224, as described herein.

Operation 610 comprises identifying, by the network equipment 200, a network configuration parameter 226 corresponding to the correlated network performance indicator. In some embodiments, identifying the network configuration parameter 226 can be based on an additional correlation detection, in addition to the correlation detection performed at operation 608. The additional correlation detection can include detecting a point biserial correlation between the network configuration parameter 226 and the correlated network performance indicator identified at operation 608.

Operation 612 comprises adjusting, by the network equipment 612, a network configuration parameter 226 corresponding to the correlated network performance indicator in order to mitigate the network 212 performance degradation and the secondary equipment 218 performance degradation. After detecting the network configuration parameter 226 responsible for the secondary equipment 218 performance degradation pursuant to operations 608 and 610, operation 612 can adjust the network configuration parameter 226 to produce a corresponding correction/improvement/optimization of the secondary equipment 218 performance. In some embodiments, secondary equipment 218 performance can be monitored and recorded before, during, and after the adjusting at operation 612 in order to expand a knowledge base for use in future adjustments of the network configuration parameter 226.

Figure 7:
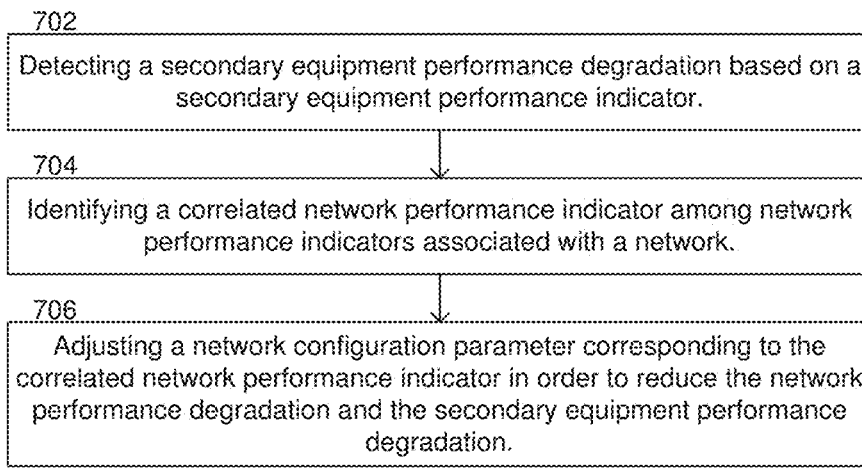
FIG. 7 is a flow diagram of a second example, non-limiting computer implemented method for adjusting network parameters based on secondary system feedback, in accordance with one or more embodiments described herein.

FIG. 7 is a flow diagram of a second example, non-limiting computer implemented method for adjusting network parameters based on secondary system feedback, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 7 can be performed by network equipment 200 comprising a controller 205 such as illustrated in FIG. 2. Operation 702 comprises detecting a secondary equipment 218 performance degradation based on a secondary equipment performance indicator 222. The detected performance degradation can comprise, e.g., a predetermined percentage change in the secondary equipment performance indicator 222, such as a 5%, 10%, or 25% drop from an average/expected value of the secondary equipment performance indicator 222, or from a peak value of the secondary equipment performance indicator 222. In some embodiments, the secondary equipment 218 performance degradation can be detected based on the secondary equipment performance indicator 222 passing a target value. The target value can comprise, e.g., a weighted average of historical values for the secondary equipment performance indicator 222.

The secondary equipment 218 can comprise, e.g., processing equipment configured to process physical or digital products, and the secondary equipment 218 can be communicatively coupled via a network 212. The secondary equipment performance indicator 222 can comprise, e.g., a process throughput of the secondary equipment 218, a cycle time of the secondary equipment 218, a delivery time of the secondary equipment 218, or any other measurement of secondary equipment 218 performance.

Operation 704 comprises identifying a correlated network performance indicator among network performance indicators 224 associated with a network 212. The network 212 can comprise a private cellular network, e.g., a private cellular network 212 deployed for the vertical industry 210 comprising the secondary equipment 218. The network equipment 200 can be operable independently of the secondary equipment 218, so that a failure of the secondary equipment 218 need not cause a failure of the network equipment 200. The secondary equipment 218 can optionally rely on functionality of the network equipment 200 in order for the secondary equipment 218 to operate, however, the network equipment 200 can implement a network 212 that remains operable regardless of the operability of the secondary equipment 218.

The network performance indicators 224 can comprise, e.g., KPIs associated with a radio of the private cellular network, such as a RAN node of the RAN 214. The correlated network performance indicator identified at operation 704 can exhibit a network performance degradation that is correlated with the secondary equipment 218 performance degradation detected at operation 702.

Operation 706 comprises adjusting a network configuration parameter 226 corresponding to the correlated network performance indicator (the correlated network performance indicator identified at operation 704) in order to reduce the network 212 performance degradation and the secondary equipment 218 performance degradation. The network configuration parameter 226 can be adjusted upwardly or downwardly, and multiple network configuration parameters 226 can optionally be adjusted. For example, when the RAN 214 comprises multiple RAN nodes, network configuration parameters 226 of some of the RAN nodes may be adjusted in a first direction, e.g., upwardly, while network configuration parameters 226 of other RAN nodes may be adjusted in a second direction, e.g., downwardly.

Figure 8:
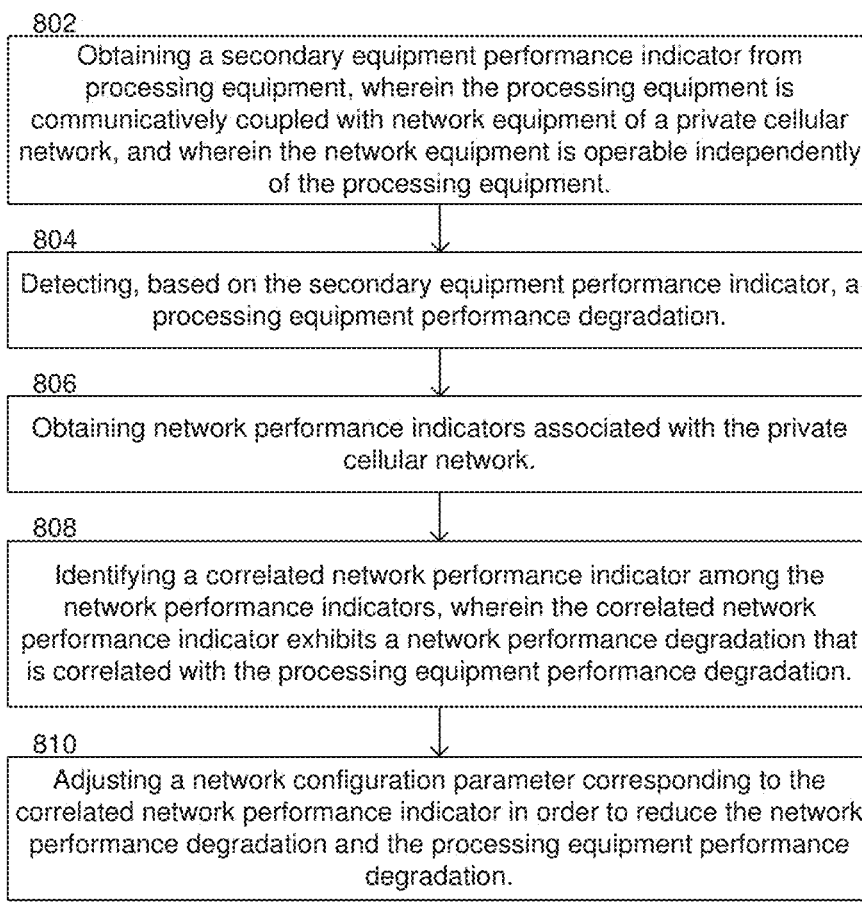
FIG. 8 is a flow diagram of a third example, non-limiting computer implemented method for adjusting network parameters based on secondary system feedback, in accordance with one or more embodiments described herein.

FIG. 8 is a flow diagram of a third example, non-limiting computer implemented method for adjusting network parameters based on secondary system feedback, in accordance with one or more embodiments described herein. The blocks of the illustrated methods represent operations according to a method, components in one or more computing devices, and/or computer executable instructions in a computer readable storage medium, as can be appreciated. While the operations are illustrated in sequence, it can furthermore be appreciated that certain operations can optionally be re-ordered, combined, removed or supplemented with other operations in some embodiments.

In an embodiment, the method illustrated in FIG. 8 can be performed by network equipment 200 comprising a controller 205 such as illustrated in FIG. 2. Operation 802 comprises obtaining a secondary equipment performance indicator 222 from processing equipment (e.g., secondary equipment 218), wherein the processing equipment 218 is communicatively coupled with network equipment 200 of a private cellular network 212, and wherein the network equipment 200 is operable independently of the processing equipment 218. The secondary equipment performance indicator 222 can comprise, e.g., a process throughput of the processing equipment 218, a cycle time of the processing equipment 218, and/or a delivery time of the processing equipment 218.

Operation 804 comprises detecting, based on the secondary equipment performance indicator 222, a processing equipment 218 performance degradation. The processing equipment 218 performance degradation can be detected, e.g., based on the processing equipment performance indicator 222 transitioning beyond a threshold value.

Operation 806 comprises obtaining network performance indicators 224 associated with the private cellular network 212. The network performance indicators can comprise, e.g., network KPIs such as a latency parameter, a data rate parameter, a QoS parameter, or other KPIs.

Operation 808 comprises identifying a correlated network performance indicator among the network performance indicators 224, wherein the correlated network performance indicator exhibits a network 212 performance degradation that is correlated with the processing equipment 218 performance degradation. In some embodiments, identifying the correlated network performance indicator can comprise, e.g., determining correlation coefficients indicative of correlation between the secondary equipment performance indicator 222 and the network performance indicators 224, as described herein.

Operation 810 comprises adjusting a network configuration parameter 226 corresponding to the correlated network performance indicator (identified pursuant to operation 808) in order to reduce the network 212 performance degradation and the processing equipment 218 performance degradation. By addressing the network 212 performance degradation which is correlated with the processing equipment 218 performance degradation, the processing equipment 218 performance degradation can effectively be addressed. Measurements of the secondary equipment performance indicator 222 and the network performance indicators 224 can be made before, during and after the adjusting at operation 810 in order to assess effectiveness of adjusting the network configuration parameter 226 based on its effect on processing equipment 218 performance. Such measurements can be used, e.g., to determine adjustment increments for future adjustments.

Figure 9:
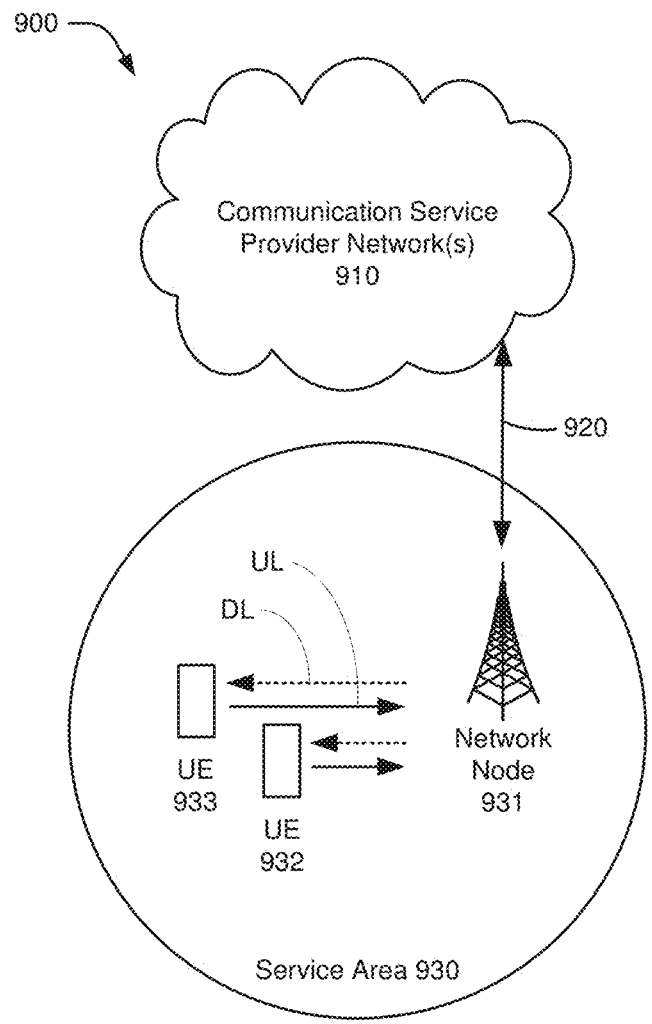
FIG. 9 illustrates an example wireless communication system, in accordance with one or more embodiments described herein.

FIG. 9 illustrates an example wireless communication system 900, in accordance with one or more embodiments described herein. The example wireless communication system 900 comprises communication service provider network(s) 910, a network node 931, and user equipment (UEs) 932, 933. A backhaul link 920 connects the communication service provider network(s) 910 and the network node 931. The network node 931 can communicate with UEs 932, 933 within its service area 930. The dashed arrow lines from the network node 931 to the UEs 932, 933 represent downlink (DL) communications to the UEs 932, 933. The solid arrow lines from the UEs 932, 933 to the network node 931 represent uplink (UL) communications.

In general, with reference to FIG. 9, the non-limiting term "user equipment" can refer to any type of device that can communicate with network node 931 in a cellular or mobile communication system 900. UEs 932, 933 can have one or more antenna panels having vertical and horizontal elements. Examples of UEs 932, 933 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 932, 933 can also comprise IOT devices that communicate wirelessly.

In various embodiments, system 900 comprises communication service provider network(s) 910 serviced by one or more wireless communication network providers. Communication service provider network(s) 910 can comprise a "core network". In example embodiments, UEs 932, 933 can be communicatively coupled to the communication service provider network(s) 910 via a network node 931. The network node 931 can communicate with UEs 932, 933, thus providing connectivity between the UEs 932, 933 and the wider cellular network. The UEs 932, 933 can send transmission type recommendation data to the network node 931. The transmission type recommendation data can comprise a recommendation to transmit data via a closed loop multiple input multiple output (MIMO) mode and/or a rank-1 precoder mode.

Network node 931 can have a cabinet and other protected enclosures, computing devices, an antenna mast, and multiple antennas for performing various transmission operations (e.g., MIMO operations) and for directing/steering signal beams. Network node 931 can comprise one or more base station devices which implement features of the network node. Network nodes can serve several cells, depending on the configuration and type of antenna. In example embodiments, UEs 932, 933 can send and/or receive communication data via wireless links to the network node 931.

Communication service provider networks 910 can facilitate providing wireless communication services to UEs 932, 933 via the network node 931 and/or various additional network devices (not shown) included in the one or more communication service provider networks 910. The one or more communication service provider networks 910 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 900 can be or comprise a large-scale wireless communication network that spans various geographic areas. According to this implementation, the one or more communication service provider networks 910 can be or comprise the wireless communication network and/or various additional devices and components of the wireless communication network (e.g., additional network devices and cell, additional UEs, network server devices, etc.).

The network node 931 can be connected to the one or more communication service provider networks 910 via one or more backhaul links 920. The one or more backhaul links 920 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 920 can also comprise wireless link components, such as but not limited to, line-of-sight (LOS) or non-LOS links which can comprise terrestrial air-interfaces or deep space links (e.g., satellite communication links for navigation). Backhaul links 920 can be implemented via a "transport network" in some embodiments. In another embodiment, network node 931 can be part of an integrated access and backhaul network. This may allow easier deployment of a dense network of self-backhauled 5G cells in a more integrated manner by building upon many of the control and data channels/procedures defined for providing access to UEs 932, 933.

Wireless communication system 900 can employ various cellular systems, technologies, and modulation modes to facilitate wireless radio communications between devices (e.g., the UEs 932, 933 and the network node 931). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 900 can operate in accordance with any 5G, next generation communication technology, or existing communication technologies, various examples of which are listed supra. In this regard, various features and functionalities of system 900 are applicable where the devices (e.g., the UEs 932, 933 and the network node 931) of system 900 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 900 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 10:
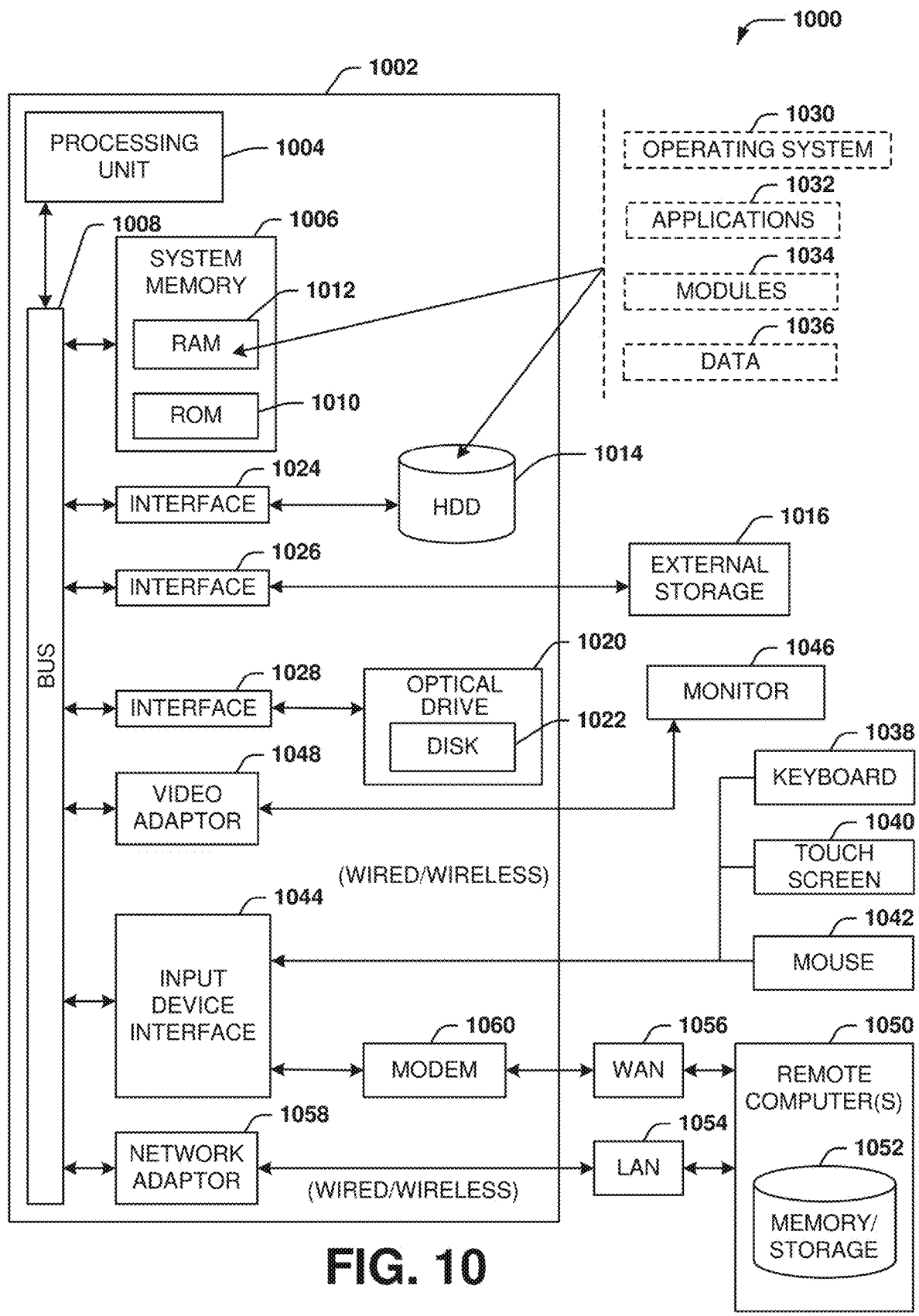
FIG. 10 illustrates a block diagram of an example computer operable to provide any of the various devices described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
obtaining, by network equipment comprising a processor, a manufacturing process performance indicator associated with a manufacturing process being controlled by automated manufacturing equipment, wherein the automated manufacturing equipment is communicatively coupled with the network equipment via a private wireless network, and wherein the network equipment is operable independently of the automated manufacturing equipment;
detecting, by the network equipment, based on the manufacturing process performance indicator, a first performance degradation of the manufacturing process;
obtaining, by the network equipment, network performance indicators associated with the private wireless network;
identifying, by the network equipment, a correlated network performance indicator among the network performance indicators, wherein the correlated network performance indicator exhibits a second performance degradation of the private wireless network that is correlated with the first performance degradation of the manufacturing process; and
implementing, by the network equipment, an adjustment to a network configuration parameter corresponding to the correlated network performance indicator that mitigates the second performance degradation of the private wireless network and the first performance degradation of the manufacturing process.

2. The method of claim 1, wherein the private wireless network comprises a private cellular network.

3. The method of claim 1, wherein the manufacturing process performance indicator comprises a process throughput of the automated manufacturing equipment, a cycle time of the automated manufacturing equipment, or a delivery time of the automated manufacturing equipment.

4. The method of claim 1, wherein the first performance degradation is detected based on the manufacturing process performance indicator passing a target value.

5. The method of claim 1, wherein the network performance indicators comprise at least one of a data rate parameter or a handover success rate parameter.

6. The method of claim 1, wherein identifying the correlated network performance indicator comprises determining correlation coefficients indicative of correlation between the manufacturing process performance indicator and the network performance indicators.

7. The method of claim 1, further comprising identifying, by the network equipment, the network configuration parameter corresponding to the correlated network performance indicator based on a point biserial correlation between the network configuration parameter and the correlated network performance indicator.

8. Network equipment, comprising:
a processor; and
a memory that stores executable instructions that, when executed by the processor, facilitate performance of operations, comprising:
obtaining a manufacturing process performance indicator associated with a manufacturing process being controlled by automated manufacturing equipment, wherein the automated manufacturing equipment is communicatively coupled with the network equipment via a private wireless network, and wherein the network equipment is operable independently of the automated manufacturing equipment;
detecting, based on the manufacturing process performance indicator, a first performance degradation of the manufacturing process;
obtaining network performance indicators associated with the private wireless network;
identifying a correlated network performance indicator among the network performance indicators network, wherein the correlated network performance indicator exhibits a second performance degradation of the private wireless network that is correlated with the first performance degradation of the manufacturing process; and
implementing an adjustment to a network configuration parameter corresponding to the correlated network performance indicator that mitigates the second performance degradation of the private wireless network and the first performance degradation of the manufacturing process.

9. The network equipment of claim 8, wherein the identifying the correlated network performance indicator comprises determining correlation coefficients indicative of correlation between the manufacturing process performance indicator and the network performance indicators.

10. The network equipment of claim 8, wherein the private wireless network comprises a private cellular network.

11. The network equipment of claim 9, wherein the network performance indicators comprise at least one of a data rate parameter or a handover success rate parameter.

12. The network equipment of claim 8, wherein the operations further comprise identifying the network configuration parameter corresponding to the correlated network performance indicator based on a point biserial correlation between the network configuration parameter and the correlated network performance indicator.

13. The network equipment of claim 8, wherein the manufacturing process performance indicator comprises a process throughput of the automated manufacturing equipment, a cycle time of the secondary automated manufacturing equipment, or a delivery time of the automated manufacturing equipment.

14. The network equipment of claim 8, wherein the first performance degradation is detected based on the manufacturing process performance indicator passing a target value, and wherein the target value comprises a weighted average of historical values for the manufacturing process performance indicator.

15. A non-transitory machine-readable medium, comprising executable instructions that, when executed by a processor, facilitate performance of operations, comprising:
   obtaining a manufacturing process performance indicator associated with a manufacturing process being controlled by automated manufacturing equipment, wherein the automated manufacturing equipment is communicatively coupled with network equipment of a private cellular network, and wherein the network equipment is operable independently of the automated manufacturing equipment;
   detecting, based on the manufacturing process performance indicator, a first performance degradation of the manufacturing process;
   obtaining network performance indicators associated with the private cellular network;
   identifying a correlated network performance indicator among the network performance indicators, wherein the correlated network performance indicator exhibits a second performance degradation of the private cellular network that is correlated with the first performance degradation of the manufacturing process; and
   implementing an adjustment to a network configuration parameter corresponding to the correlated network performance indicator that mitigates the second performance degradation of the private cellular network and the first performance degradation of the manufacturing process.

16. The non-transitory machine-readable medium of claim 15, wherein the manufacturing process performance indicator comprises a process throughput of the automated manufacturing equipment, a cycle time of the automated manufacturing equipment, or a delivery time of the automated manufacturing equipment.

17. The non-transitory machine-readable medium of claim 15, wherein the first performance degradation is detected based on the manufacturing process performance indicator transitioning beyond a threshold value.

18. The non-transitory machine-readable medium of claim 15, wherein the network performance indicators comprise a latency parameter.

19. The non-transitory machine-readable medium of claim 15, wherein identifying the correlated network performance indicator comprises determining correlation coefficients indicative of correlation between the manufacturing process performance indicator and the network performance indicators.

20. The non-transitory machine-readable medium of claim 15, wherein the operations further comprise identifying the network configuration parameter corresponding to the correlated network performance indicator based on a point biserial correlation between the network configuration parameter and the correlated network performance indicator.

* * * * *